United States Patent [19]

Kienberger

[11] Patent Number: 5,467,387
[45] Date of Patent: Nov. 14, 1995

[54] METHOD FOR INFLUENCING A SIGNALING PROCEDURE WITH THE ASSISTANCE OF COMMUNICATION TERMINAL EQUIPMENT OF A COMMUNICATION SYSTEM

[75] Inventor: Helmut Kienberger, Munich, Germany

[73] Assignee: Siemens Aktiengesellschaft, Munich, Germany

[21] Appl. No.: 161,409

[22] Filed: Dec. 6, 1993

[30] Foreign Application Priority Data

Dec. 18, 1992 [DE] Germany .................. 42 43 074.7

[51] Int. Cl.$^6$ ............................................. H04M 1/60
[52] U.S. Cl. .......................................... 379/167; 379/201
[58] Field of Search ................................. 379/355, 201, 379/388, 216, 88, 167

[56] References Cited

U.S. PATENT DOCUMENTS 4,425,627  1/1984  Eibner ........................... 379/388
4,908,853  3/1990  Matsumoto ..................... 379/355

OTHER PUBLICATIONS

"ISDN in the Office—HICOM", Telcom Report and Siemens Magazine COM, Dec. 1985, pp. 36–41.
IBM Technical Disclosure Bulletin vol. 33 No. 4 Sep. 1990, "Computer–Telephone Software Interface".

*Primary Examiner*—Stephen Chin
*Assistant Examiner*—Kevin Kim
*Attorney, Agent, or Firm*—Hill, Steadman & Simpson

[57] ABSTRACT

In a method for influencing a signaling procedure communication terminal equipment of a communication system, subscriber performance features are displayed on a display at the communication terminal equipment. The individual subscriber performance features are then optically marked by means of two navigation keys and the marking is controlled in a forward direction and in a reverse direction. A subscriber performance feature is selected by actuating an activation key that is located at the communication terminal equipment.

2 Claims, 2 Drawing Sheets

METHOD FOR INFLUENCING A SIGNALING PROCEDURE WITH THE ASSISTANCE OF COMMUNICATION TERMINAL EQUIPMENT OF A COMMUNICATION SYSTEM

BACKGROUND OF THE INVENTION

The present invention is directed to a method for influencing a signaling procedure in a communication system.

Integrating ISDN functions into an already existing network environment means a great multiplicity of functions in periphery and control. Different device types and networks for voice, text, data and image communication require different interfaces, signalings, transmission rates and protocols. These functions as well as the possibility of technological and functional innovation are offered by modular periphery concepts of contemporary ISDN communication systems. The system controller realizes the through-connection as well as the storing and processing of information dependent on the system size with a uniform modular processor concept.

The realization of those functions and performances features, however, requires the employment of communication terminal equipment that was previously unknown in analog communication systems. In particular, the use of hardkey-controlled communication termination equipment facilitates the use of a multitude of subscriber performance features sequencing in the communication system. Hardkey control means that subscriber performance features can be called in at the communication terminal equipment in conformity with the subscriber's wishes by actuating keys provided for this purpose. Such communication terminal equipment is described in the publication "ISDN im Buero", Reporting from Telcom Report and Siemens Magazin COM, 1985, for example on page 41. Specific subscriber performance features such as, for example, automatic redialing, automatic callback, call forwarding, etc., are thereby permanently allocated to hardkey keys located at the communication terminal equipment. The corresponding subscriber performance features are called in by actuating one of these hardkey keys. The permanent allocation is usually implemented before the communication system is put in service. What is problematical about such a procedure, however, is that the multitude of subscriber performance features has grown to such an extent that a fixed allocation of a subscriber performance feature to a hardkey key would mean an unmanageably large number of keys.

SUMMARY OF THE INVENTION

It is an object of the present invention to allocate a plurality of subscriber performance features to a manageable number of hardkey keys in order to achieve a practical utilization of respective communication terminal equipment.

In general terms, the present invention is a method for influencing a signaling procedure using communication terminal equipment of a communication system, the communication terminal equipment having a numerical keyboard that controls call setup to other communication terminal equipment and having keys for controlling subscriber performance features, and the communication system having a switching unit in which the switching-oriented processes sequence. The method comprises the steps of: providing key functions stored in a static key memory of the switching unit; displaying the key functions on a display means of a respective communication terminal equipment under control of a display control procedure and optically marking a respective key function; controlling the optical marking in a forward direction on the display means dependent on actuation of a first navigation key located at the respective communication terminal equipment and in a reverse direction on the display means dependent on actuation of a second navigation key located at the respective communication terminal equipment; writing a present optically marked key function into a dynamic key memory of the switching unit; and actuating an activation key located at the respective communication terminal equipment to thereby transfer the key function stored in the dynamic key memory to a protocol handler, the protocol handler then supplying one of the key functions and a message indicative of the key function to the switching-oriented processes that are then activated for implementation of the respective subscriber performance feature.

It is an advantage of the present invention that the key functions are controlled by a display control procedure as a menu on a display means of the communication terminal equipment, whereby one of the key functions is optically marked. The marking is then controllable in a clockwise direction or in a counter-clockwise direction dependent on the actuation of first and second navigation keys located at the communication terminal equipment. When a currently marked subscriber performance feature is to be activated, an activation key at the communication terminal equipment is actuated. The advantage of the present invention is that a multitude of subscriber performance features can be activated by actuating a single key, namely the activation key.

In a further development of the present invention code functions for the keys are stored in the static key memory. This provides the advantage that the code functions that in the prior art had to be input in a complicated manner can be fetched in a more practical manner.

A plurality of key menus that have no logical relationship to one another can be brought onto the display means via a suitable operating procedure. Simultaneous actuation of first and second navigation keys and the subsequent input of a number (1 . . . 9) is proposed for menu selection. The marking and activation of the desired subscriber performance feature within each and every menu is then controlled in accord with the above-described procedure of the method of the present invention.

An arrangement for implementing the method is also part of the present invention. In addition to a few hardkeys and the number keyboard responsible for the call setup to other communication terminal equipment, the first and second navigation key as well as an activation key and a display means are thereby provided at the communication terminal equipment. This provides the advantage that the communication terminal equipment has a surveyable plurality of keys and can thus be utilized in a practical way.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
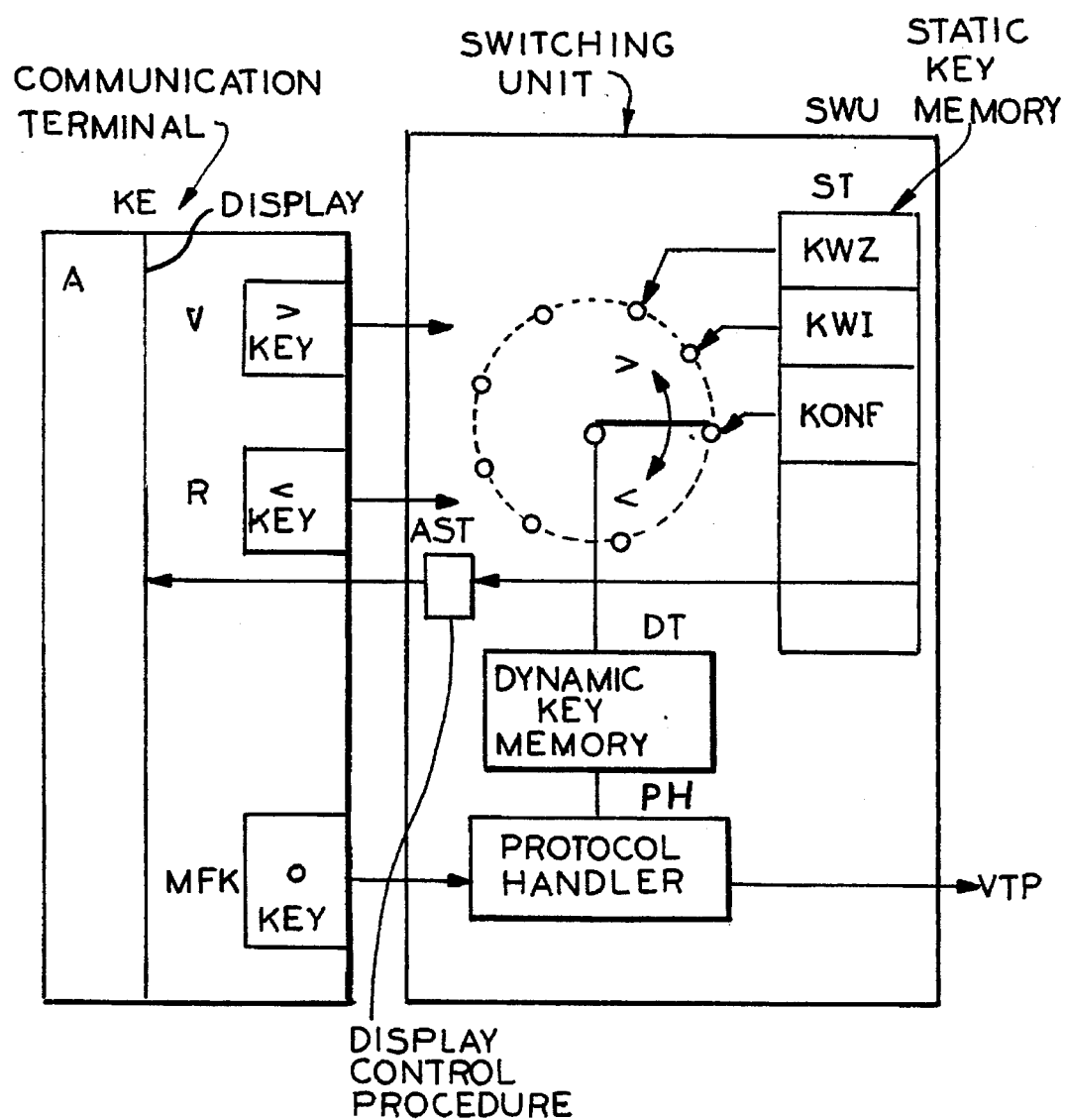
FIG. 1 is a block diagram depicting the modular concept of the method of the present invention.

FIG. 1 shows a communication terminal equipment KE having a display means A, an activation key MFK as well as a navigation key V and a navigation key R. A switching unit SWU is also shown in FIG. 1 and has a static key memory ST and a dynamic key memory DT. The corresponding key functions are stored in the static key memory ST. The following abbreviations are thereby employed for key functions in the exemplary embodiment for applications in the Federal Republic of Germany:

| | |
|---|---|
| KWZ | speed calling, central; |
| KWI | personalized speed calling; |
| NV | non-voice; |
| AUSG | output; |
| ANZU | function display suppression; |
| UHR | time of day; |
| TEIN | deadline on; |
| TAUS | deadline off; |
| KONF | conference; |
| ID | identification/call tracing; |
| VMS | voice mail; and |
| PA | park. |

A display control procedure AST is also provided in the switching unit SWU, this implementing the selection events on the display means A. Ultimately, a protocol handler PH is also implemented in the switching unit SWU. It serves the purpose of converting the physical key code received from the communication terminal equipment KE into a logical key message that is then correspondingly forwarded to the processes of the switching technology VTP given actuation of the activation key MFK.

Figure 2:
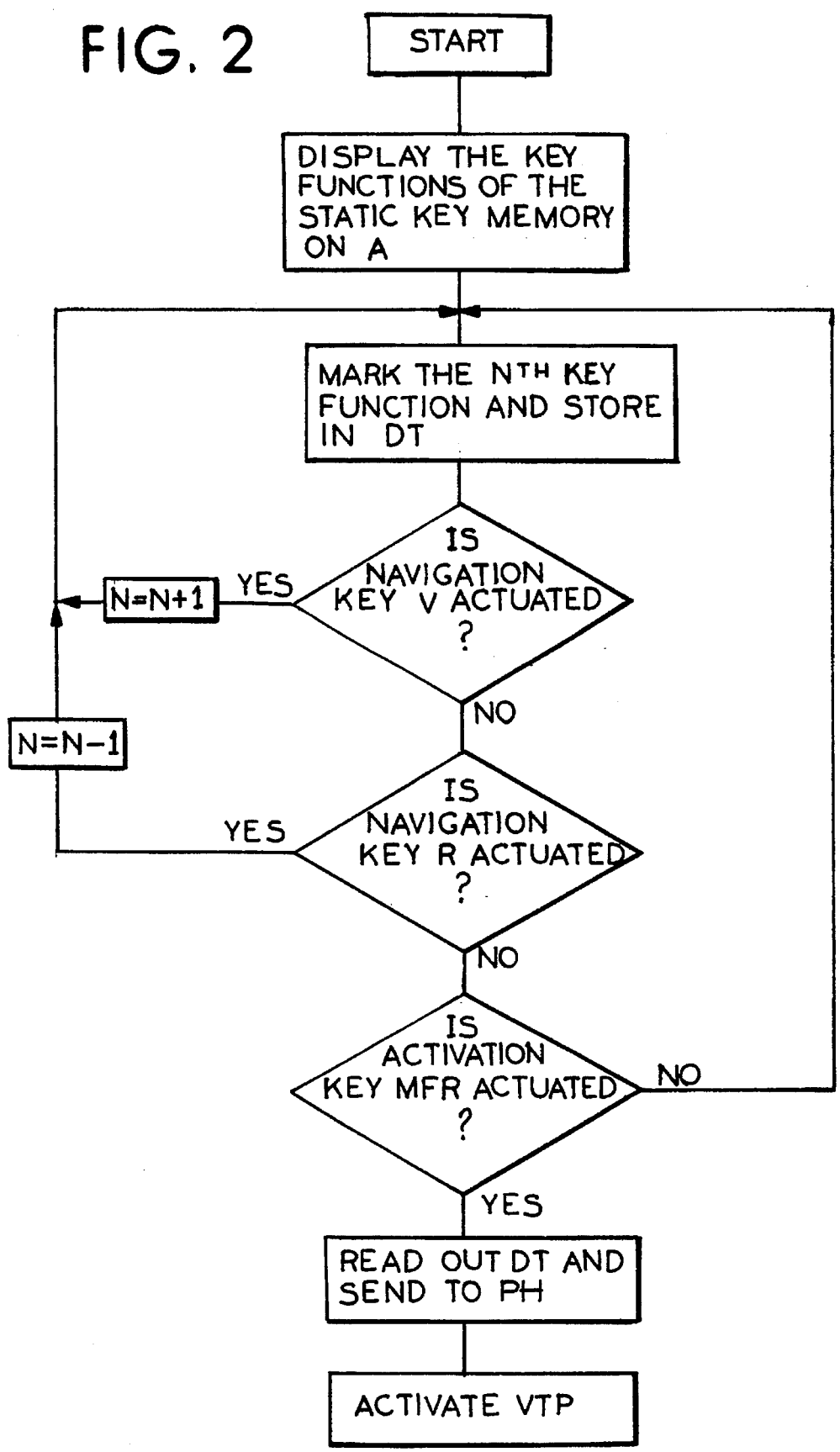
FIG. 2 is a flowchart of the method of the present

The method of the present invention shall be set forth in greater detail below with reference to a flowchart in FIG. 2.

The key functions stored in the static key memory ST are controlled by the display control procedure AST on the display means A of the communication terminal equipment KE. One of the displayed key functions is thereby optically marked. This can occur, for example, on the basis of special optical emphasis. The marking can also be controlled in clockwise direction or, in counter-clockwise direction dependent on the actuation of one of the two navigation keys. When, for example, all possible key functions in the respective menu are displayed on the display means A, then a single actuation of the navigation key V means that the marking is driven in a forward direction by respectively one key function. The analogous case applies to the reverse direction upon actuation of the navigation key R. All key functions shown on the optical display means A can thus be marked in an appropriate way. In the present exemplary embodiment, the subscriber performance feature KONF is to be activated. To this end, a marking must be implemented by actuating one of the two navigation keys V, R. Each marked key function is thereby stored in the dynamic key memory DT. When the key function KONF is marked on the display means A, then the activation key MFK is actuated at the communication terminal equipment KE. The protocol handler PH is thus initiated to retrieve the key function KONF stored in the dynamic key memory DT and to convert this into a logical key message. The result is transmitted to the switching-oriented processes VTP of the switching unit SWU. The appropriate switching-oriented procedures and processes for implementation of the subscriber function KONF are then activated.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for influencing a signaling procedure using communication terminal equipment of a communication system, said communication terminal equipment having a numerical keyboard that controls call setup to other communication terminal equipment, and the communication system having a switching unit in which switching-oriented processes sequence, the method consisting of:

providing only a first navigation key, a second navigation key and an activation key for controlling key functions;

providing code functions of said key functions, said code functions being stored in a static key memory of the switching unit, said key functions corresponding to the subscriber performance features;

displaying the key functions on a display of a respective communication terminal equipment;

selecting and optical marking a respective key function in a forward direction on the display dependent on actuation of a first navigation key located at the respective communication terminal equipment and in a reverse direction on the display dependent on actuation of a second navigation key located at the respective communication terminal equipment;

for a present optically marked key function retrieving the corresponding code function from the static key memory and storing it in a dynamic key memory of the switching unit; and actuating an activation key located at the respective communication terminal equipment to thereby transfer the corresponding code function stored in the dynamic key memory to a protocol handler, the protocol handler then supplying a logical key message indicative of the respective key function to the switching-oriented processes that are then activated, said key functions being controlled by only said first navigation key, said second navigation key and said activation key.

2. The method according to claim 1, wherein the method further comprises selecting a plurality of key menus that have no logical relationship to one another by simultaneous actuation of the first and second navigation keys, and subsequently inputting a numeral characteristic of a respective key menu.

* * * * *